United States Patent Office 3,654,339
Patented Apr. 4, 1972

3,654,339
METHOD FOR THE PRODUCTION OF SUBSTITUTED CYANOBUTYRIC ACIDS
Helmut aus der Fünten, Mondorf, and Hermann Richtzenhain, Schwellenbach, Germany, assignors to Dynamit Nobel AG, Troisdorf, Germany
No Drawing. Filed Aug. 28, 1969, Ser. No. 853,920
Claims priority, application Germany, Sept. 4, 1968,
P 17 93 347.0
Int. Cl. C07c *121/40*
U.S. Cl. 260—464                                                      3 Claims

ABSTRACT OF THE DISCLOSURE

Method for the production of substituted 4-cyanobutyric acids of the general formula:

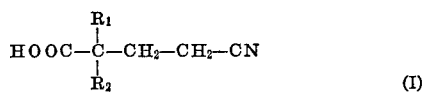

(I)

in which $R_1$ and $R_2$ either signify alkyl groups with 1–4 C-atoms, or in which $R_1$ and $R_2$ together with the carbon atom to which they are attached form a carbocyclic ring, by oxidation of corresponding substituted 4-cyanobutyric aldehydes of the general formula:

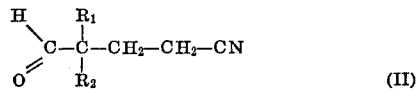

(II)

in which $R_1$ and $R_2$ have the meaning indicated above, in which the oxidation is carried out with halogen in the presence of water.

---

The oxidation of aldehydes with oxygen, oxygen-containing gases or other oxidating agents to their corresponding acids is known. For example, this oxidation is known using chromic acid mixtures and for nitric acid as oxidizing agents. Many of the oxidizing agents which are known for converting aldehydes to carbonylic acids cannot be used where the compound being oxidized contain other functional groups, such as for instance nitrile groups. Thus, it is not possible, to produce 2,2-dialkyl-4-cyanobutyric acids by oxidation of the corresponding 2,2-dialkyl-4-cyano-butyraldehydes using nitric acid as the oxidizing agent, because the nitrile group is simultaneously hydrolized and the corresponding dicarboxylic acids are obtained (Houben-Weyl, Meth. d. Org. Chemie., vol. 8, 4th edition, page 413). The same applies to this oxidation using chromic acid mixtures. Thus, the corresponding 2,2-dialkyl glutaric acids (compare DBP 842 192) are obtained when treating the 2,2-dialkylated cyanobutyraldehydes in an acid medium with oxidizing and saponifying agents.

It has now surprisingly been found that cyanoaldehydes of the above Formula II can be converted to the cyano acids of the above Formula I by oxidizing the aldehyde group in the presence of at least the stoichiometrical amount of water and at least one halogen such as bromine or chlorine. Excellent yields are obtained. Despite the fact that a strongly acid medium exists because of the formation of HCl, the cyano group surprisingly remains unchanged.

Aldehydes which can be advantageously oxidized into the corresponding carboxylic acids in accordance with this method are for instance 2,2-dimethyl-, 2,2-diethyl-, 2-ethyl- 2-n-butyl-, 2-ethyl-2-isopropyl-, 2,2-tetramethylene-, 2,2-pentamethylene-4-cyanobutyraldehydes and the like. The cyanobutyraldehyde are readily prepared by β-cyanoethylation of known aldehydes. The method of this invention, however, is not limited to aldehydes made by such cyano ethylation.

The oxidation of the substituted cyano aldehydes is carried out in such a manner that the cyanoaldehyde is finely dispersed in water and about 95 to 105% of stoichiometrically required amount of halogen is introduced into this emulsion. A larger excess is to be avoided because of the danger of the formation of chlorinated by-products.

It was found that, during oxidation, the temperature of the reaction mixture has to be kept low in order to avoid a saponification of the nitrile group. For purposes of the invention, the oxidation temperature should not exceed 40° C. Preferred temperature range is 5–30° C., which is easy to maintain by cooling. Also lower temperatures down to about —5° C. can be used.

The ratio of water to cyano aldehyde is not critical to the oxidation. As a rule, the cyano aldehyde is dispersed in 1 to 3 times its weight of water.

Appreciably lesser amounts of water are disadvantageous in that the danger of forming chlorinated products is increased. Larger amounts of water are disadvantageous because purification is made more difficult, and particularly additional extraction of the product cyano carboxylic acid is thus required.

The oxidation velocity of the cyanobutyraldehydes to the corresponding butyric acids is high, so that in the presence of stoichiometric amounts of halogen no unconverted cyano aldehydes were found. Thus, the halogen conversion is equivalent to the conversion of the cyano aldehydes. Practically, the reaction velocity is only limited by the veolcity with which the halogen can be introduced, or by the solution velocity of the halogen in the reaction mixture. By the addition of emulsifiers, it is possible to improve the dispersion of the cyano aldehydes in water to form an emulsion.

The heat of reaction is advantageously removed by cooling. At constant, low temperatures, the solubility of the halogen is high and a loss of halogen, e.g., gaseous chlorine, can be avoided or minimized. At temperatures below 0° C., however, the oxidation velocity of the cyano aldehydes is considerably decreased and therefore 5 to 30° C. is the preferred reaction temperature.

The formed cyanocarboxylic acids can be extracted from the acidic aqueous solution by suitable solvents insensitive to acid. Well suited solvents are chlorinated hydrocarbons, such as methylene chloride, chloroform, carbon tetra chloride, 1,2-dichloroethane and the like. Preferable is 1,2-dichloroethane. Also hydrocarbons, such as benzene or toluene, are usable. The cyanocarboxylic acid is recovered by distilling off the solvents.

The normally solid 2,2-dialkyl-4-cyanobutyric acids are thereby obtained directly in crystalline form. If necessary, a purification is possible by recrystallization or by distillation of the water-free acids at reduced pressure.

The cyanobutyric acids can be used as insecticidal agents.

The method in accordance with the invention is described in greater detail in the examples.

Concentrations are in wt. percent, conversions and yields in mol percent.

EXAMPLE 1

In a closed glass vessel (Erlenmeyer-flask), there is added at 18.5° C. the stoichiometric equivalent amount of 2,2-dimethyl-4-cyanobutyraldehyde (0.994 g.) to 100 g. of chlorine water with 0.566% chlorine content (iodometric titration). The dimethyl cyanobutyrid aldehyde goes very quickly into solution. The chlorine conversion is 78.5% after 1.5 hours, 83.2% after 3.75 hours and 90.9% after 21.0 hours as measured by iodometric titration. The aqueous solution is extracted with cold 1,2-dichloroethane. Extraction agents and diluted hydrochloric acid are distilled off in vacuum at 25° bath temperature.

There remains as residue 0.98 g. (87.3% of theory). The IR-spectrum shows the characteristic bands of the 2,2-dimethyl-4-cyanobutyric acid (CN at 2240 cm.$^{-1}$/4.4$\mu$, —COOH at 3000 cm.$^{-1}$/3–3.3$\mu$ and at 1700 cm.$^{-1}$/5.89$\mu$. The residue slowly crystallizes out upon standing and has a melting point of 40–42°. When using equivalent amounts of bromine instead of chlorine water, like results are obtained.

EXAMPLE 2

In the manner set forth in Example 1, there are added at 22.5° C., 2.65 g. of 2-ethyl-2-butyl-4-cyanobutyraldehyde to 200 g. of chlorine water containing 0.52% chlorine. For the purpose of better distribution, the reaction mixture is well stirred with a magnetic stirrer. The chlorine conversion is 68.1% after 1 hour, 75.0% after 2 hours, 80.2% after 3 hours and 89.8% after 21 hours. After analogous working-up, there remains 2-ethyl-2-butyl-4-cyanobutyric acid as residue.

EXAMPLE 3

In the manner set forth in Example 1, there are added at 22.5° C. 1.00 g. of 2-ethyl-2-isopropyl-4-cyanobutyraldehyde to 100 g. of chlorine water with 0.415% chlorine. The chlorine conversion is 67.0% after 30 minutes, 83.0% after 1.5 hours, 92.3% after 2.5 hours, 95.7% after 3.5 hours and 96.4% after 4.5 hours. After analogous working-up, there remains 1 g. residue which slowly commences to crystallize. Recrystallized from dilute alcohol, the 2-ethyl-2-isopropyl-4-cyanobutyric acid has a melting point of 94°. The acid yield after 3.5 hours of reaction time corresponds to the chlorine conversion.

$C_{10}H_{17}NO_2$ (mol wt. 183).—Calculated (percent): C, 65.55; H, 9.29; N, 7.65. Found (percent): C, 65.07; H, 9.27; N, 7.79.

EXAMPLE 4

187.5 g. (1.5 mols) of 2,2-dimethyl-4-cyanobutyraldehyde and 300 g. of $H_2O$ are placed into a cylindrical glass vessel provided with centrifugal stirrer, inlet pipe, thermometer and a bubble counter, and emulsified by rapid rotation of the stirrer. Chlorine is introduced into this emulsion while simultaneously cooling the reaction vessel to 18 to 19° C. in such manner that the entire amount of chlorine is taken up. After 5 hours, the stoichiometric amount of chlorine had been added. For the completion of the reaction, stirring was continued for another 30 minutes and any chlorine still present was removed by passing nitrogen through the system. The reaction mixture is several times extracted with pre-cooled 1,2-dichloroethane while shaking, whereupon the extraction agent is distilled off at a bath temperature of 25° under water jet vacuum and finally at 0.3 torr. The flask contents crystallizes out after short standing. Melting point of 2,2-dimethyl-4-cyanobutyric acid: 41–42°. Yield 192 g. (91% of theory).

EXAMPLE 5

Following the procedure of Example 4, but using corresponding amounts of (a) 2,2-diethyl-4-cyanobutyraldehyde and (b) 2,2-pentamethylene-4-cyanobutyraldehyde, these are obtained the corresponding cyanobutyric acids in yields of about 90%.

The use of a 5% stoichiometric excess of chlorine gives the same yields.

What is claimed is:

1. Process for producing substituted 4-cyanobutyric acids of the general formula:

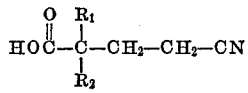

comprising oxidizing a cyanoaldehyde of the general formula:

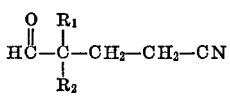

wherein $R_1$ and $R_2$ are each an alkyl group to 1 to 4 carbon atoms or, together with the carbon atom to which they are attached are a hydrocarbyl carbocyclic ring of up to 7 carbon atoms, which oxidation is carried out at about —5 to 40° C. in the presence of about the stoichiometric amount of at least one halogen selected from the group consisting of chlorine and bromine and at least the stoichiometric amount of water in relation to said cyanoaldehyde.

2. Process as claimed in claim 1 carried out at 5 to 30° C.

3. Process as claimed in claim 1 wherein said water is present in proportion of about 1 to 3 times the amount of cyanoaldehyde.

References Cited

UNITED STATES PATENTS 2,443,118    6/1948    Plump ............ 260—530 R

JOSEPH P. BRUST, Primary Examiner

U.S. Cl. X.R.

260—465.4